R. F. RUNGE.
GAUGE.
APPLICATION FILED APR. 3, 1920.

1,435,501.

Patented Nov. 14, 1922.

Inventor
Robert F. Runge
By his Attorneys
Rogers, Kennedy Campbell

Patented Nov. 14, 1922.

1,435,501

UNITED STATES PATENT OFFICE.

ROBERT F. RUNGE, OF PHILADELPHIA, PENNSYLVANIA, ASSIGNOR TO THE HESS-BRIGHT MANUFACTURING COMPANY, A CORPORATION OF DELAWARE.

GAUGE.

Application filed April 3, 1920. Serial No. 370,975.

*To all whom it may concern:*

Be it known that I, ROBERT F. RUNGE, a citizen of the United States, residing at Philadelphia, in the county of Philadelphia and State of Pennsylvania, have invented certain new and useful Improvements in Gauges, of which the following is a specification, reference being had therein to the accompanying drawing.

This invention relates to adjustable or reformable gauges of the plug gauge type, and has for an object to provide a gauge of this character which, when the measuring surface or periphery becomes worn, can be radially restored to its former condition and size, and also one in which the radius of the cylindrical segments may be either increased or decreased as occasion demands.

In the drawings accompanying this specification one practicable embodiment of the invention is illustrated, in which drawings.

Figure 1:
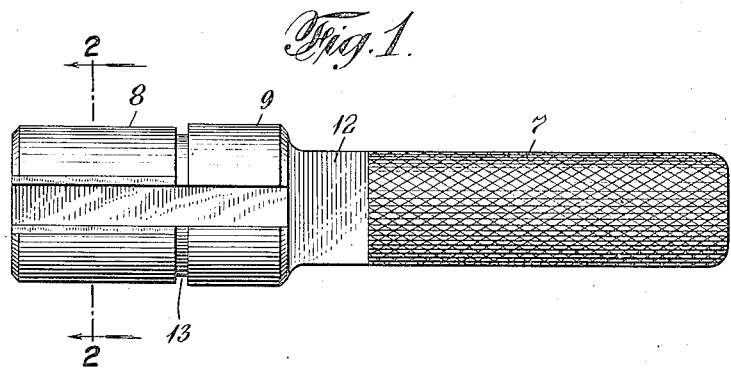
Figure 1 shows a form of plug gauge equipped with my improvement and wherein there is shown, at one end of the instrument, maximum and minimum plugs.
Figure 2:
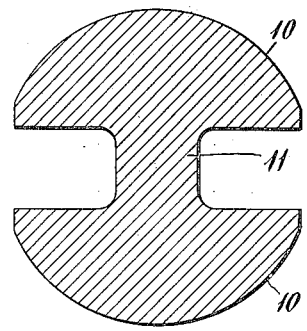
Fig. 2 is an enlarged cross section taken at about the plane of line 2—2 of Fig. 1.

In Fig. 1, a form of gauge is illustrated wherein there is provided a handle 7, preferably knurled, which carries a plug for measuring or testing the inside surface or bore of some body. The gauge herein illustrated is of a type for measuring the cylindrical bores of various work pieces and may therefore be described as a cylindrical plug gauge. The particular form shown is made up as a tolerance gauge, there being a minimum or "go" portion 8 and a maximum or "no go" portion 9. Heretofore in plug gauges, and particularly cylindrical plug gauges, it has been found that there has been waste owing to the difficulty of expanding the measuring surfaces of the plug, after these have been worn in use, so as to bring them to the prescribed diameter. According to my invention the measuring surface or work engaging surface 10 is shown divided into segments, that is if the plug is cylindrical these are the segments of a cylinder. There are preferably two of these measuring portions having the proper segmental surfaces such segments being shown integrally connected by a relatively thin web 11. In the illustration the web is shown extending into the neck portion 12 uniting the plug to the handle 7.

Each of the segmental faces 10 is shown as having an arc of considerably over 90 degrees, preferably approximating 120 degrees. Heretofore it has been proposed to form a flat bar with arc shaped faces for gauging the bore of a hole, but it has been found in practice that a solid cylindrical plug gauge of ordinary construction will not go into a bore into which the type of gauge just mentioned of the same rating will go. In other words such gauges cause a minus error in use. The large contact surface of my improved plug, more nearly approaching a complete cylinder, offers more resistance to deformation than does such flat type of gauge.

When the measuring surfaces of my gauge have become worn, or for some other reasons it is desired to reform the cylindrical surface, the gauge maker strikes the web 11 a blow preferably with the tapering end of a machinist's hammer while the opposite side of the web is resting upon a suitably formed anvil. This has the effect of expanding the web laterally and carrying the segments 10—10 further apart. The perimeter of the gauge is now out of center and it therefore becomes necessary to polish or lap the faces of these segments and bring them into segments having the outline of a true cylinder.

Figure 3:
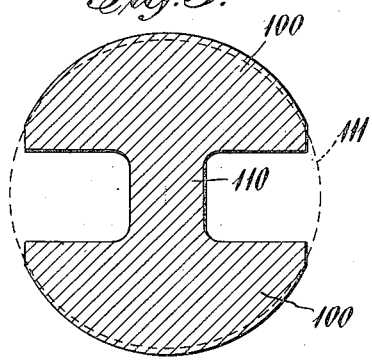
Fig. 3 is a diagram illustrating the manner or method of adjusting the gauge.

An exaggerated representation in the Fig. 3 diagram shows the web 110 compressed and extended, and the segments 100 moved apart to such an extent that the axes of their segmental surfaces do not coincide. This lack of concentricity of such surfaces is made apparent by the dotted circle 111. The material extending beyond the cylindrical outline which is represented by this circle 111 is lapped off, whereupon the plug assumes its original or other desired proportions.

If the cylinder becomes somewhat tapered, owing to the wear which naturally takes place at the outer edge, a blow of a hammer against the end of the web 11 corrects this error.

The measuring surfaces of the two plug portions 8 and 9 are preferably separated by a cylindrical channel 13. The function of this channel is well known to those skilled in the art. In justifying the gauge according to my invention both portions, the maximal portion and the minimum portion, may be expanded accordingly by action upon the web 11 throughout its entire length. In many instances it is found necessary to justify one or the other of these plugs without altering the other, and in some instances it is found that one or the other will require more alteration for effecting the justification than will the other. The portion of the web peculiar to the particular plug portion which requires treatment may be acted upon independently of the web portion peculiar to the other plug member so that the justification of one portion may be effected independently, and without disturbing the set of the other plug portion.

The drawings herein are for the purpose of illustrating the invention, and it is for this reason that some parts are shown out of proportion, since it would be impracticable in a drawing of this character to show the difference in diameter between the maximum and minimum plugs which exists in actual practice. Also in the diagram in Fig. 3 it is obvious that the material which is shown extending beyond the proposed contour is far in excess of what will be removed in most instances in practice.

Changes may be made within the scope of the claims as occasion requires, without departing from the spirit of my invention.

I claim as my invention:

1. A reformable gauge, comprising a cylindrical plug having two diametrically opposite channels formed in its periphery setting the plug off into two segments integrally connected by a web, the combined width of said channels being less than ninety degrees at the surface of the cylinder, and the web being capable of elongation by lateral compression.

2. A reformable gauge, comprising a cylindrical plug having two diametrically opposite channels formed in its periphery setting the plug off into two segments integrally connected by a web, the combined width of said channels being less than ninety degrees at the surface of the cylinder, and the web being capable of elongation by lateral compression, and a handle integrally connected to the web.

In testimony whereof, I have affixed my signature hereto.

ROBERT F. RUNGE.